United States Patent
Vilmur

(10) Patent No.: US 6,373,829 B1
(45) Date of Patent: *Apr. 16, 2002

(54) METHOD AND APPARATUS FOR GROUP CALLS IN A WIRELESS CDMA COMMUNICATION SYSTEM USING OUTBOUND TRAFFIC CHANNELS FOR INDIVIDUAL GROUP MEMBERS

(75) Inventor: Richard Joseph Vilmur, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/065,278

(22) Filed: Apr. 23, 1998

(51) Int. Cl.[7] .................................. H04B 7/216
(52) U.S. Cl. ................... 370/335; 370/342; 455/518
(58) Field of Search ................... 370/329, 331, 370/335, 342; 455/518, 522

(56) References Cited

U.S. PATENT DOCUMENTS

| | | |
|---|---|---|
| 5,056,109 A | 10/1991 | Gilhousen et al. |
| 5,257,283 A | 10/1993 | Gilhousen et al. |
| 5,265,119 A | 11/1993 | Gilhousen et al. |
| 5,267,262 A | 11/1993 | Wheatley, III |
| 5,383,219 A | 1/1995 | Wheatley, III et al. |
| 5,485,486 A | 1/1996 | Gilhousen et al. |
| 5,621,723 A | 4/1997 | Walton, Jr. et al. ........... 370/18 |
| 5,881,368 A * | 3/1999 | Grob et al. ................... 455/69 |
| 6,178,166 B1 * | 1/2001 | Wilson et al. .............. 370/335 |
| 6,181,685 B1 * | 1/2001 | Chinitz et al. .............. 370/335 |

* cited by examiner

*Primary Examiner*—Min Jung
(74) *Attorney, Agent, or Firm*—Christopher P. Moreno; Jeffrey K. Jacobs

(57) ABSTRACT

In a wireless CDMA system, responsive to receiving a request for a group call for a given talk group, a controller (12) allocates an outbound group call channel to the group (202), and uniquely assigned inbound and outbound channels to each subscriber unit in the group (203). Each subscriber unit in the group receives an identification of its uniquely assigned inbound and outbound channels (303). Via its uniquely assigned outbound channel, a given subscriber unit receives inbound control information (304) from the controller. By providing each subscriber unit in the group with a uniquely assigned outbound channel, in addition to the outbound group call channel, control information is readily provided to multiple subscriber units, thereby facilitating the establishment of group calls in CDMA systems.

21 Claims, 3 Drawing Sheets

METHOD AND APPARATUS FOR GROUP CALLS IN A WIRELESS CDMA COMMUNICATION SYSTEM USING OUTBOUND TRAFFIC CHANNELS FOR INDIVIDUAL GROUP MEMBERS

CROSS-REFERENCE TO RELATED APPLICATION

Related subject matter is disclosed in prior co-pending, commonly assigned patent applications entitled "Establishment of Multiple Low-Rate Inbound Signaling Links in CDMA Dispatch System" Ser. No. 08/959,327, "Fast Call Setup In a CDMA Dispatch System" Ser. No. 08/1959,152, both filed Oct. 28, 1997, "Method and Apparatus for a Talkgroup Call In a Wireless CDMA System" Ser. No. 08/958,041 filed Oct. 27, 1997, and "Method And Apparatus For Group Calls In A Wireless CDMA Communication System" having attorney docket number CM03845H and filed on even date herewith.

FIELD OF THE INVENTION

The present invention relates generally to the field of wireless communications and, more particularly, to code division multiple access (CDMA) communication systems and dispatch group call communication systems.

BACKGROUND OF THE INVENTION

A typical dispatch two-way radio communication system comprises communication units, communication resources, communication sites, and a communication resource allocator. Each of the sites have a substantially distinct coverage area and are geographically located throughout the system. Each site also has a number of communication resources assigned to it, where at least one of the communication resources is used as a control channel, while a number of the remaining communication resources are used as voice channels. Such systems are known to use both frequency division multiple access (FDMA) and time division multiple access (TDMA) methods to rebroadcast transmissions.

In a system that supports dispatch group calls, subsets of the communication units are typically arranged into communication groups (talk groups) and may be located anywhere within the system (in any site). When a communication unit of a talk group requests a group call, it transmits, via a control channel of the site in which it is located, an inbound signaling message to the communication resource allocator. (A group call typically allows all members of the same talk group that are located within the system to communicate with each other.) The inbound signaling message generally comprises the requesting communication unit's individual identification number, identification of the requesting communication unit's talk group, and a request for a group call. Upon receiving the inbound signaling message, the communication resource allocator will allocate a voice channel in any necessary sites to the requesting communication unit's talk group.

Thus, in FDMA and TDMA dispatch systems a forward link is established (one in each site where communication units are present) and monitored by all units involved in the group call in that site, and a single reverse link which is used by the group member who is currently transmitting to the other members. Non-transmitting talk group members are typically in a listen only mode (i.e., not able to transmit when another member is talking) and thus are not allocated a dedicated reverse link. In a TDMA system, for example, time slots are allocated to different users. A talk group member transmitting on an assigned reverse link, is allowed to use full power transmission to support short bursts of signals in allocated time slots. Despite the discontinuous or discrete nature of this approach, the listener receives what appears to be a continuous service.

In the last decade, in response to an ever-accelerating worldwide demand for mobile and personal portable communications, spread spectrum digital technology, of which one type is known as code division multiple access (CDMA), has proved to be an alternative for serving large populations of multiple access users over analog or other digital technologies. CDMA relies on processing gain to extract a coded signal spread across a broad frequency spectrum. The only way to extract the wanted signal from among many other overlaid unwanted signals is to utilize the right code. The use of coding allows more channels to be derived by the overlaying of spread signals one over another and greatly enhances performance in terms of derived channels per hertz of bandwidth.

CDMA is well suited for cellular communications, but has never been employed in a system supporting dispatch group calls. The difficulties in applying CDMA techniques to dispatch group communications (such as forward and reverse power control and the need to support soft hand-offs) are discussed in co-pending patent applications "Establishment of Multiple Low-Rate Inbound Signaling Links in CDMA Dispatch System" Ser. No. 08/959,327, "Fast Call Setup In a CDMA Dispatch System" Ser. No. 08/959,152. In addressing these problems, both of these prior applications discuss the establishment of a low-rate (non-voice) signaling link in the reverse direction (inbound). Using such a low-rate inbound signaling link, which signals at a predetermined rate substantially less than that of a full-rate traffic link, proportionately less average power is required for dispatch communications than would otherwise be the case if full-rate traffic links were provided instead to non-talking talk group members. Additionally, it is recognized in these prior applications that such low-rate reverse links can be used to maintain the correct reverse link power control for each non-talking member to allow for fast channel access for any follow-on calls (i.e., group-wide calls initiated by non-talking members following a current group call transmission).

While reverse links for dispatch group calls can be used to facilitate reverse power control, substantial difficulties must be overcome. In particular, it must be recognized that in existing CDMA systems, reverse power control is maintained in accordance with information sent over a forward (outbound) channel. In particular, existing CDMA systems use in-band control signaling (i.e., control signaling embedded in an outbound traffic channel) to continuously instruct individual subscriber units how to adjust their reverse power, typically up to 800 times per second. This method works well for one-to-one type calls. However, this method quickly breaks down for one-to-many type calls. In particular, the amount of information required to continuously update even a modest number of non-talking members in a group call would occupy too much of a given outbound traffic channel's bandwidth, leaving little, if any, bandwidth for the actual outbound traffic. Additionally, because the outbound traffic channel in a group call scenario would not be assigned to a single user, as in one-to-one type calls, it becomes necessary to direct specific reverse power control information to each of the non-talking members.

Thus, there exists a need to provide reliable and efficient reverse power control for group call communications in CDMA systems.

DESCRIPTION OF A PREFERRED EMBODIMENT

The present invention generally provides reliable and efficient reverse power control for group call communications in CDMA systems. Upon receiving a request for a group call for a given talk group, a controller allocates an outbound group call channel to the group, and a uniquely assigned outbound channel to each subscriber unit in the group. Identification of the outbound group call channel is sent to the group. Additionally, each subscriber unit in the group receives an identification of its uniquely assigned outbound channel, which is preferably a variable rate channel. Via its uniquely assigned outbound channel, a given subscriber unit can receive inbound power control information and/or soft hand-off control information from a controller. By providing each subscriber unit in the group with a uniquely assigned outbound channel, in addition to the outbound group call channel, the present invention allows control information to be provided to multiple subscriber units and, therefore, facilitates the establishment of group calls in CDMA systems.

Figure 1:
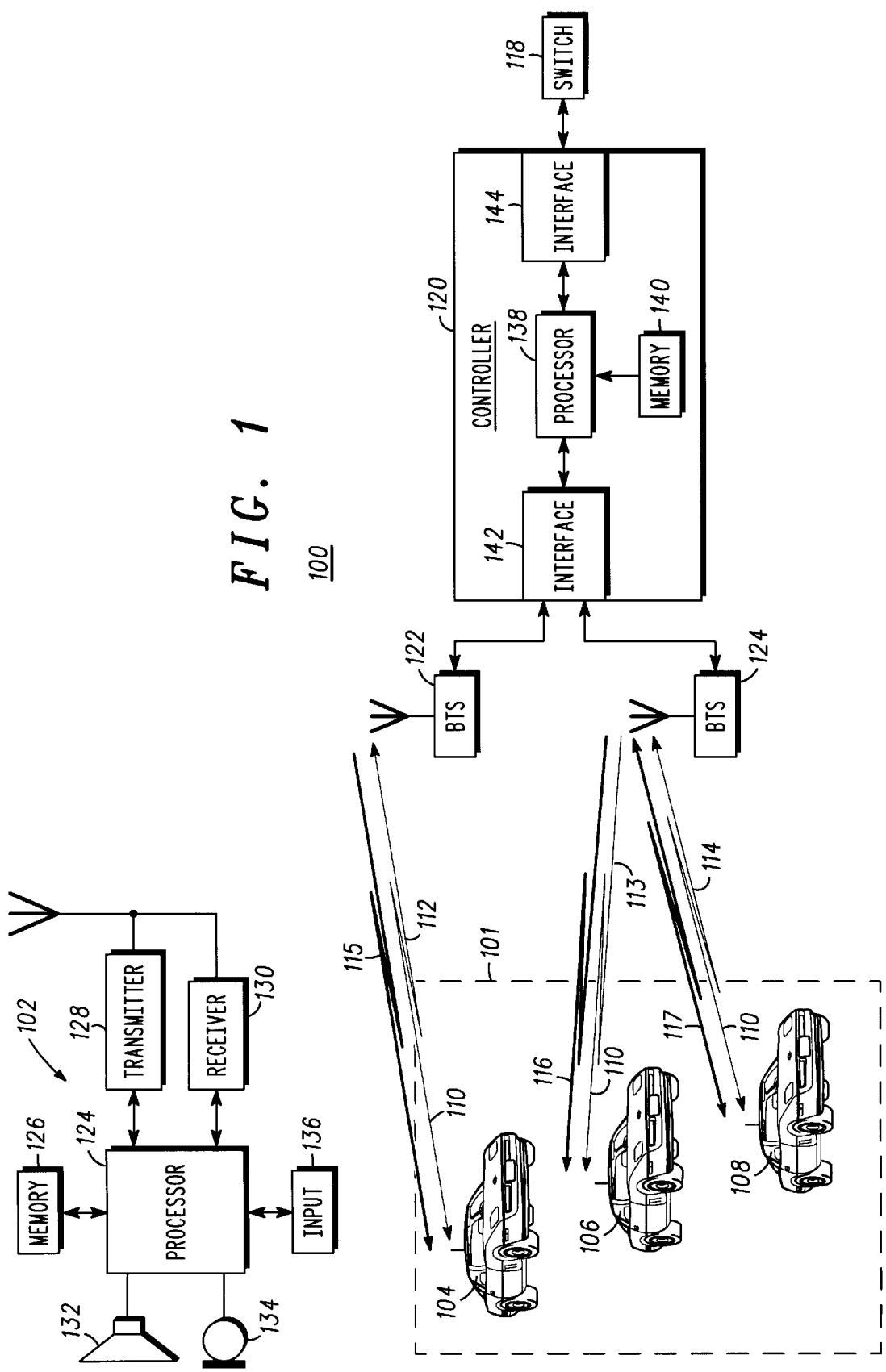
FIG. 1 is a block diagram of wireless communication system in accordance with the present invention.

The present invention can be more fully described with reference to FIGS. 1–3. FIG. 1 is a block diagram of a wireless communication system 100 in accordance with the present invention. The wireless communication system 100 is a suitably modified CDMA system, such as a Wideband Spread Spectrum Digital Cellular System in accordance with, for example, the Telecommunications Industry Association/Electronic Industries Association Interim Standard 95 (TIA/EIA/IS-95) as known in the art, and comprises a plurality of subscriber units 102–108 of which a subset 104–108 is arranged into at least one talk group 101 in wireless communication with a fixed infrastructure. In the illustrative embodiment, each of the subscriber units 102–108 is physically capable of duplex communications, although during typical group communications, only a single subscriber unit is transmitting at a time.

Communication channels are effectively provided through the use of codes using well known techniques, e.g., through a combination of orthogonal Walsh codes and pseudorandom noise (PN) sequences as in conventional cellular CDMA systems. When processing a group call, one or more outbound codes are used to effectively provide an outbound group call channel (forward link) 110 to each subscriber unit in the talk group 101. At least one subscriber unit is provided a uniquely assigned inbound channel (reverse link) 112; in practice, this is typically at least the subscriber unit which initiates the group call. However, in the preferred embodiment, each subscriber unit in the group that is provided with the outbound group call channel 110 is also provided with its own uniquely assigned inbound channel 112–114. Additionally, the present invention uses individual outbound codes to provide uniquely assigned outbound channels (forward links) 115–117 to each subscriber unit in the talk group 101. In the preferred embodiment, each of the uniquely assigned inbound and outbound channels is a variable rate link which idles at 1/8 rate when signaling (other than power control information) is not sent, and jumps to 1/2 rate or higher when signaling is sent from the infrastructure to a corresponding subscriber unit, or vice versa.

In the example illustrated in FIG. 1, multisite operation is shown, i.e., where the subscriber units corresponding to the group are spread out among more than one site. In particular, the outbound group call channel 110, a first uniquely assigned inbound channel 112 and a first uniquely assigned outbound channel 115 are provided to a first subscriber unit 104 at a first site via a first base transceiver site 122 using codes unique within that site. Additionally, the outbound group call channel 110, a second and third uniquely assigned inbound channel 113–114, and a second and third uniquely assigned outbound channel 116–117 are provided to second and third subscriber units 106–108, respectively, at a second site via a second base transceiver site 124 using codes that are unique within the second site and, depending on various system parameters such as geographic site separation, possibly the same as the codes used in the first site. Of course, it is possible that all subscriber units corresponding to a group could be located within a single site, in which case a single base transceiver site would be used to provide the channels.

The fixed infrastructure comprises those elements normally required to support communications within the wireless system 100 and, in the preferred embodiment, conforms to a typical CDMA architecture. In particular, the fixed infrastructure comprises a switch 118 in communication with a controller 120 that, in turn, is in communication with base transceiver systems (BTSs) 122–124. The switch 118 (often referred to as a Mobile Switching Center or MSC), controller 120 (often referred to as a Base Station Controller or BSC) and BTSs 122–124 are all well known in the art. The BTSs 122–124 are used for the transmission and/or reception of the outbound group call channel 110, the inbound traffic channel 112 and the uniquely assigned outbound channels 115–117. In practice, switch 118 typically communicates with more than one controller, and may communicate with other equipment not shown. For purposes of simplicity, the fixed infrastructure has been limited as shown in FIG. 1. The management of group call processing is preferably handled by the controller 120. In the alternative, the functionality of group call handling, as described below, may be distributed throughout the fixed infrastructure.

Each of the subscriber units 102–108 comprises a common set of elements. In particular, a processor 124, which typically comprises a one or more processing devices (e.g., microprocessors, digital signal processors, etc.), is coupled to memory 126. The processor 124 is coupled to a transmitter 128, receiver 130, speaker 132, microphone 134 and input device 136. Each of these elements are well-known in the art. In the preferred embodiment, under control of software algorithms stored in the memory 126 and in cooperation with the other elements shown, the processor 124 performs those tasks required for operation of the subscriber unit, including the method described relative to FIG. 3. The receiver 130 is used to receive, in part: assignments of outbound and/or inbound codes for use in talk group calls, any voice and/or data traffic, and any deallocation messages. The input device 136, which may comprise a keypad, menu-driven display, push-to-talk button or similar device, allows users to transmit requests for group calls and to talk.

A typical, high-level construction of the controller 120 is also shown in detail in FIG. 1. A processor 138, which typically comprises a one or more processing devices (e.g., microprocessors, digital signal processors, etc.), is coupled to memory 140. Additionally, the processor 138 is coupled to interfaces 142, 144 which support communications between the controller 120 and the BTSs 122–124 and the switch 118, respectively. Each of these elements is well known in the art. In the preferred embodiment, under control of software algorithms stored in the memory 140 and in cooperation with the other elements shown, the processor 138 performs those tasks required for operation of the controller, including the method described relative to FIG. 2.

Figure 2:
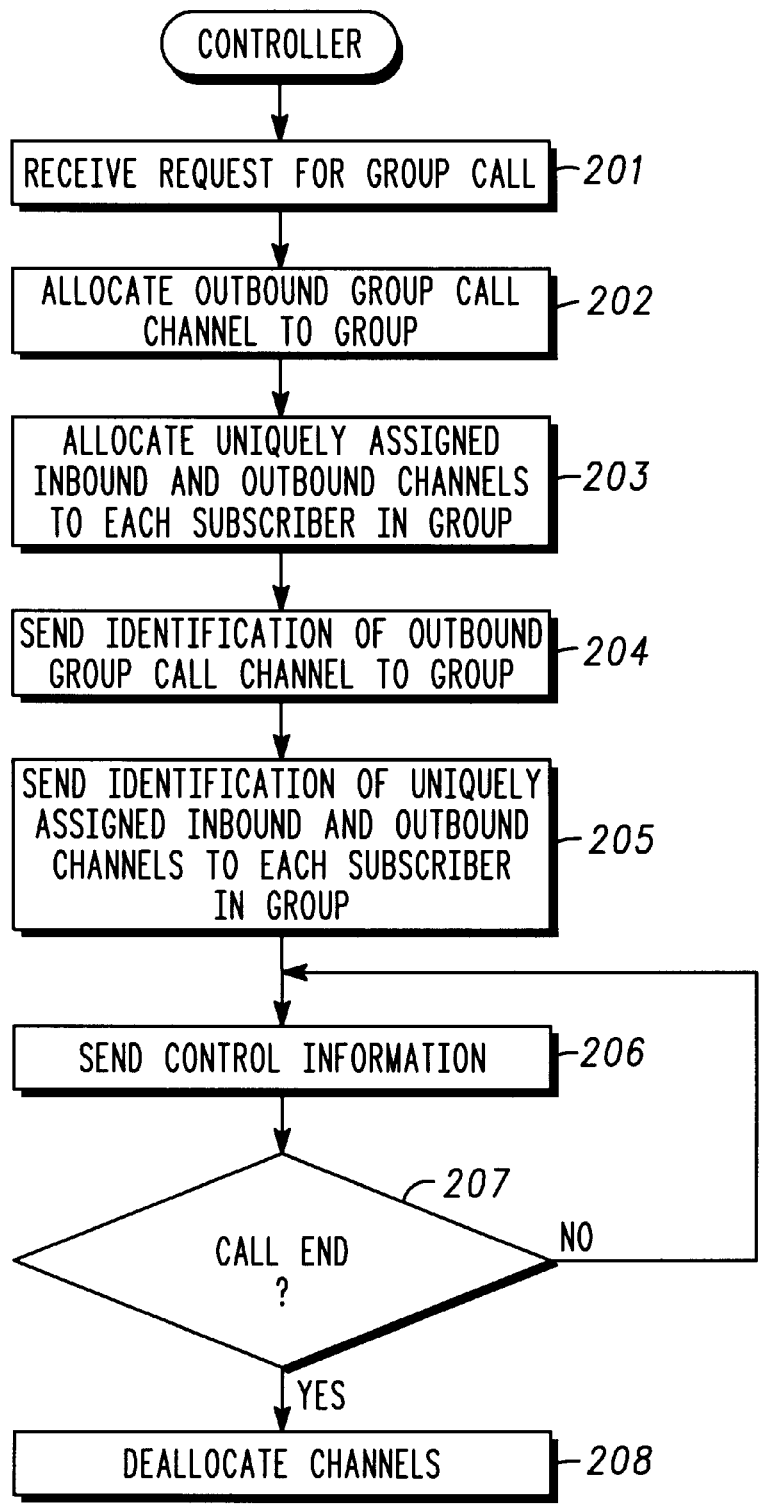
FIG. 2 is a flow chart illustrating a method for a controller in accordance with the present invention.

FIG. 2 is a flow chart illustrating a method whereby a controller can support a group call. The method described in FIG. 2 is preferably carried out by a controller. In the alternative, however, the functionality illustrated in FIG. 2 may be distributed throughout the fixed infrastructure, including the BTSs coupled to the controller. Regardless, the method illustrated in FIG. 2 is preferably implemented as stored software routines that are executed by the platforms in which the software is stored.

At step 201, the controller receives a request for a group call specifying at least the talk group for which the call is intended. Typically, the group call request can be originated by a subscriber unit that is a member of the targeted talk group or by a fixed dispatch position (not shown) wishing to establish communications with the talk group.

Responsive to receiving the request, the controller, at step 202, allocates an outbound group call channel to at least some (preferably, all) of the subscriber units in the group targeted in the group call. In the context of the present invention, the controller allocates the outbound group call channel by reserving one or more codes for the outbound group call channel. (The particular form of the code, i.e., a Walsh code, pseudorandom code, etc. is not relevant to the present invention. The only requirement is that the selected code or codes provide unique channels within each site.) In practice, more than one code will be used because the subscriber units that make up the talk group will be distributed throughout many different cells, i.e., the coverage areas defined by separate BTSs. Because of this geographical diversity, a different code must be used in each cell in order to minimize any interference. In the example shown in FIG. 1, the outbound group call channel 110 would be provided using one code in the site serviced by the first BTS 122, and by another code in the site serviced by the second BTS 124 assuming that the sites are contiguous. It is possible that the same code could be used if the sites are not contiguous.

At step 203, the controller allocates uniquely assigned inbound and outbound traffic channels to each of the subscriber units that were allocated the outbound group call channel at step 202. In the preferred embodiment, these channels are uniquely assigned in the sense that, within a given site, the subscriber units included in the group that are to be allocated a unique inbound and outbound channel are each allocated separate and unique codes. As a result, any control information conveyed using the uniquely assigned codes, either in the inbound or outbound direction, for a given subscriber unit would be sourced/received only by that subscriber unit. Once again, given the geographic diversity between sites, it is possible that the same codes could be assigned to two different subscriber units in two different sites without destroying the uniqueness between codes required by the present invention.

At step 204, the controller sends identification of the outbound group call channel to the subscriber units that were allocated the outbound group call channel at step 202. Techniques for accomplishing this are well known in the art. For example, in a typical CDMA system, this would be accomplished by transmitting, via the paging channel within a given cell, information which identifies the code allocated for the outbound group call channel in that cell. Again, assuming the group call requires the use of resources within multiple cells, the outbound group call channel identification information would be unique to each cell.

Similar to step 204, the controller sends, to each of the subscriber units that were allocated the outbound group call channel, identifications of uniquely assigned inbound and outbound channels at step 205. Again assuming a CDMA system, this would be accomplished by transmitting, via the paging channel within a given cell, information which identifies the codes allocated to a given subscriber unit in that cell. Where multiple group members are currently operating within a single cell, each subscriber unit receives identifications of codes that establish unique channels within that cell. Because each subscriber unit is provided with uniquely assigned inbound and outbound channels, the present invention facilitates group call functionality, particularly in that power control information and soft hand-off control information (both inbound and outbound) can be conveyed and processed in a manner similar to existing systems.

At step 206, the controller optionally sends control information (on a cell-by-cell basis, if necessary) to each of the subscriber units involved in the group call via their respective uniquely assigned outbound channels. Likewise, corresponding control information can also be sent from the subscriber units to the infrastructure via their respective uniquely assigned inbound channels. The present invention contemplates at least two types of control information that could be conveyed via the uniquely assigned inbound and outbound channels: soft hand-off control information and/or power control information. The form and processing of such control information is well known in the art. Of course, other types of control information could also be sent depending on the design and capabilities of the system. In the preferred embodiment, inbound power control information is continuously sent to each subscriber unit which units, in turn, can continuously adjust their inbound transmission power in accordance with well known techniques. The soft hand-off control information is sent to a given subscriber unit on an as-needed basis as the subscriber unit roams throughout the system. Likewise, forward power control information and/or subscriber-initiated soft hand-off control information can be sent by individual subscriber units using well known techniques.

The controller continues to send the control information, as described above, to each subscriber unit for the duration of the group call. When, at step 207, it is determined that the group call has ended, the controller deallocates the outbound group call channel and the uniquely assigned inbound and outbound channels at step 208. After deallocation, the codes used to provide the outbound group call channel and the uniquely assigned inbound and outbound channels are available for other uses.

Figure 3:
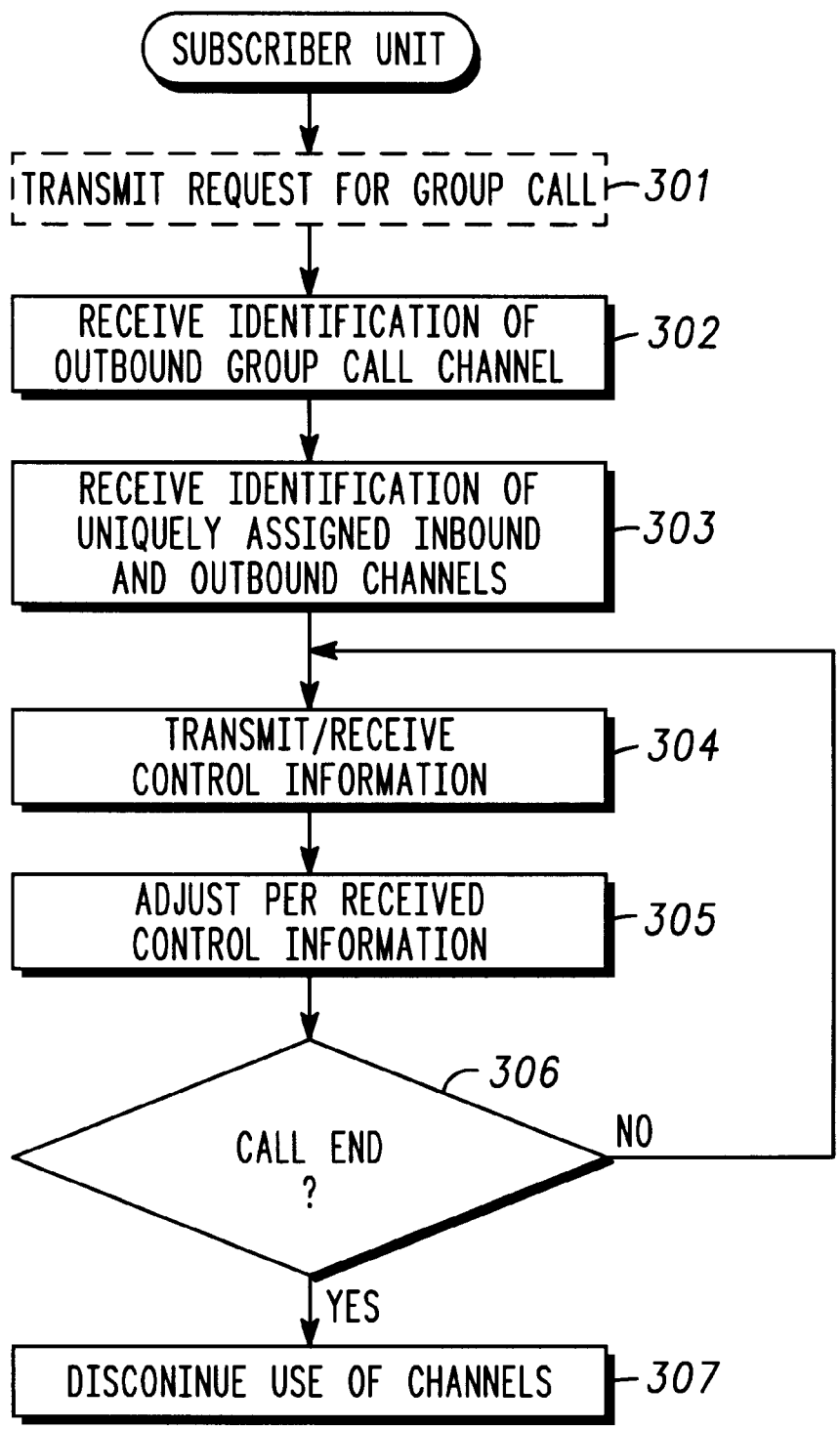
FIG. 3 is a flow chart illustrating a method for a subscriber unit in accordance with the present invention.

FIG. 3 is a flow chart illustrating a method whereby a subscriber unit can participate in a group call. The method illustrated in FIG. 3 is preferably implemented as stored software routines that are executed by each subscriber unit.

At step 301, a subscriber unit may optionally transmit a request for a group call. For the purposes of the present invention, any unit which transmits a request for a group call is assumed to be the initial transmitting unit for the group call. However, it is also possible that a group call is not initiated by any subscriber unit in the group, as would be the case for a group call initiated by a dispatch operator. In that case, step 301 would not be executed.

Regardless, after a group call has been initiated, the subscriber unit (as a member of the targeted group) receives identification of an outbound group call channel allocated to the group call at step 302. The subscriber unit can be the transmitting subscriber unit, or it can be one of the non-transmitting group members. In the preferred embodiment, the identification of the outbound group call channel comprises an identification of a code. Similarly, at step 303, the subscriber unit receives identification of uniquely assigned inbound and outbound channels which, in the preferred embodiment, comprises identifications of unique codes.

In order for a transmitting subscriber unit to not hear a delayed version of the group transmission, a transmitting subscriber unit would not demodulate the outbound group call channel unless system signaling on the uniquely assigned outbound channel indicated that a different subscriber unit was going to be the originating transmitter for the group.

At step 304, via the uniquely assigned inbound and outbound channels, the subscriber unit transmits/receives control information which, in the preferred embodiment, comprises at least soft hand-off control information and/or power control information. If inbound power control information is received, the subscriber unit, at step 305, adjusts its transmission power according to the received power control information. Steps 304 and 305 are continuously repeated for the duration of the group call. It should be noted that the subscriber unit, using known techniques, simultaneously receives and demodulates the uniquely assigned outbound channel and the outbound group call channel assigned to the group call. When, at step 306, it is determined that the group call has ended (in accordance with known techniques), the subscriber unit discontinues use of the uniquely assigned inbound and outbound channels and the outbound group call channel at step 306.

The present invention generally provides for the reliable and efficient exchange of control information for group call communications in CDMA systems. Through the use of uniquely assigned inbound and outbound channels allocated to each subscriber unit included in a group call, a controller or subscriber may issue unique control information, including soft hand-off and power control information. As a result, power control and soft hand-off operations during a group call may occur in a substantially similar manner as in existing systems. In this manner, the present invention overcomes the limitation of prior art techniques and thereby supports group communications that were previously unavailable in CDMA systems.

The foregoing description of a preferred embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

I claim:

1. A subscriber unit for use in a wireless CDMA communication system comprising a plurality of base stations coupled to a controller, the plurality of base stations in wireless communication with a plurality of subscriber units that includes the subscriber unit, the subscriber unit comprising:

means for receiving, from the controller, an identification of an outbound group call channel allocated to a group, wherein the subscriber unit is in a subset of the plurality of subscriber units logically arranged into the group targeted in a group call; and means for receiving, from the controller, an identification of a uniquely assigned outbound channel for use in the group call.

2. The subscriber unit of claim 1, further comprising the means for receiving the identification of the uniquely assigned outbound channel, wherein the identification of the uniquely assigned outbound channel is an identification of a uniquely assigned outbound code.

3. The subscriber unit of claim 1, further comprising the means for receiving the identification of the uniquely assigned outbound channel, wherein the uniquely assigned outbound channel comprises a variable-rate channel.

4. The subscriber unit of claim 1, further comprising:

means for receiving, via the uniquely assigned outbound channel, at least one of soft hand-off control information and inbound power control information.

5. A controller for use in a wireless CDMA communication system comprising a plurality of base stations coupled to the controller, the plurality of base stations in wireless communication with a plurality of subscriber units, the controller comprising:

means for receiving, from a requesting subscriber unit of a group, a request for a group call, wherein a subset of the plurality of subscriber units are logically arranged into the group targeted in the group call;

means for allocating an outbound group call channel to at least some subscriber units of the subset responsive to the request; and means for allocating a uniquely assigned outbound channel to each of the at least some subscriber units of the subset responsive to the request.

6. The controller of claim 5, further comprising:

means for sending, to the at least some subscriber units of the subset, identification of the outbound group call channel responsive to the request; and means for sending, to each of the at least some subscriber units of the subset, identification of the uniquely assigned outbound channel responsive to the request.

7. The controller of claim 6, further comprising the means for sending the identification of the uniquely assigned outbound channel, wherein the identification of the uniquely assigned outbound channel is an identification of a uniquely assigned outbound code.

8. The controller of claim 5, further comprising the means for allocating the uniquely assigned outbound channel to each of the at least some subscriber units of the subset, wherein the uniquely assigned outbound channel comprises a variablerate channel.

9. The controller of claim 5, further comprising:

means for transmitting, to each of the at least some subscriber units of the subset via the uniquely assigned outbound channel, at least one of soft hand-off control information and inbound power control information.

10. The controller of claim 5, further comprising:

means for deallocating, for each of the at least some subscriber units of the subset, the uniquely assigned outbound channel when the group call has ended.

11. In a wireless CDMA communication system comprising a plurality of base stations coupled to a controller, the plurality of base stations in wireless communication with a plurality of subscriber units, a method for a subscriber unit of the plurality of subscriber units to participate in a group call, the method comprising steps of:
    receiving, from the controller, an identification of an outbound group call channel allocated to a group, wherein the subscriber unit is in a subset of the plurality of subscriber units logically arranged into the group targeted in the group call; and
    receiving, from the controller, an identification of a uniquely assigned outbound channel for use in the group call.

12. The method of claim 11, wherein the step of receiving the identification of the uniquely assigned outbound channel further comprises receiving an identification of a uniquely assigned outbound code.

13. The method of claim 11, further comprises the step of receiving the identification of the uniquely assigned outbound channel, wherein the uniquely assigned outbound channel comprises a variable-rate channel.

14. The method of claim 11, further comprising a step of:
    receiving, via the uniquely assigned outbound channel, at least one of soft hand-off control information and inbound power control information.

15. The method of claim 14, further comprising a step of:
    adjusting, responsive to receiving the inbound power control information, inbound transmission power of the subscriber unit.

16. In a wireless CDMA communication system comprising a plurality of base stations coupled to a controller, the plurality of base stations in wireless communication with a plurality of subscriber units, a method for the controller to establish a group call, the method comprising steps of:
    receiving, from a requesting subscriber unit of a group, a request for a group call, wherein a subset of the plurality of subscriber units are logically arranged into the group targeted in the group call;
    allocating an outbound group call channel to at least some subscriber units of the subset responsive to the request; and
    allocating a uniquely assigned outbound channel to each of the at least some subscriber units of the subset responsive to the request.

17. The method of claim 16, further comprising steps of:
    sending, to the at least some subscriber units of the subset, identification of the outbound group call channel responsive to the request; and
    sending, to each of the at least some subscriber units of the subset, identification of the uniquely assigned outbound channel responsive to the request.

18. The method of claim 17, further comprising the step of sending the identification of the uniquely assigned outbound channel, wherein the identification of the uniquely assigned outbound channel is an identification of a uniquely assigned outbound code.

19. The method of claim 16, further comprising the step of allocating the uniquely assigned outbound channel to each of the at least some subscriber units of the subset, wherein the uniquely assigned outbound channel comprises a variable-rate channel.

20. The method of claim 16, further comprising a step of:
    transmitting, to each of the at least some subscriber units of the subset via the uniquely assigned outbound channel, at least one of soft hand-off control information and inbound power control information.

21. The method of claim 16, further comprising a step of:
    deallocating, for each of the at least some subscriber units of the subset, the uniquely assigned outbound channel when the group call has ended.

* * * * *